March 23, 1948. W. P. LEAR 2,438,223
MAGNETICALLY ACTUATED CLUTCH AND BRAKE CONSTRUCTION
Filed Oct. 30, 1945 2 Sheets-Sheet 1

INVENTOR
WILLIAM P. LEAR
BY
Richard A Mawe
ATTORNEY

March 23, 1948.     W. P. LEAR     2,438,223
MAGNETICALLY ACTUATED CLUTCH AND BRAKE CONSTRUCTION
Filed Oct. 30, 1945     2 Sheets-Sheet 2
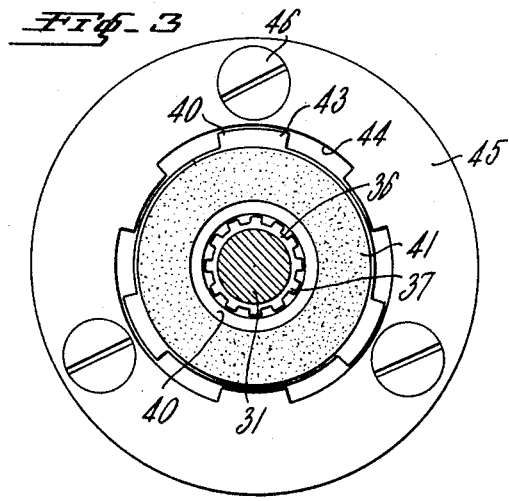
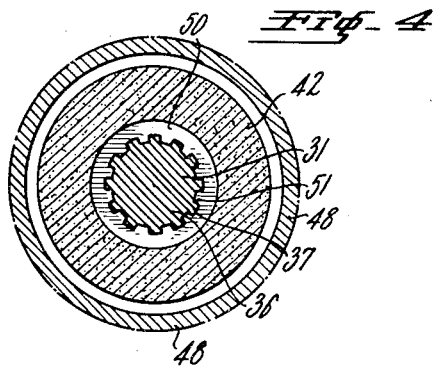
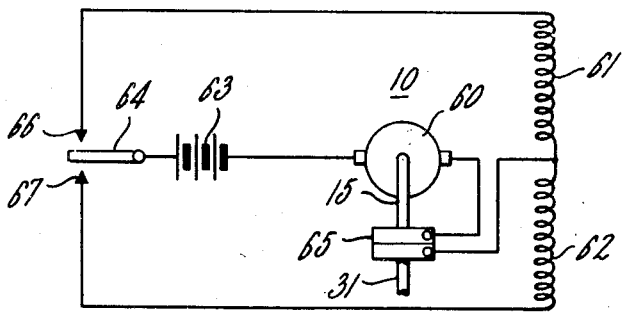
INVENTOR
WILLIAM P. LEAR
BY
Richard A Mars
ATTORNEY

Patented Mar. 23, 1948

2,438,223

UNITED STATES PATENT OFFICE 2,438,223

MAGNETICALLY ACTUATED CLUTCH AND BRAKE CONSTRUCTION

William P. Lear, North Hollywood, Calif., assignor, by mesne assignments, to Lear, Incorporated, Grand Rapids, Mich., a corporation of Illinois Application October 30, 1945, Serial No. 625,495

11 Claims. (Cl. 192—18)

This invention relates to a magnetic clutch, and more particularly to such clutch having a preloaded brake for a rotatable shaft.

In its broadest aspects, the invention comprises a pair of frictionally engaged members one of which is coupled to a shaft and the other of which is rotatable thereon. A non-rotatable device is provided for selectively engaging the rotatable member to provide a frictional braking effect on the shaft. Adjustable means are provided for preselecting the pressure of the frictional engagement between the two members so that a predetermined braking effect may be attained whenever the rotatable member is locked against movement.

The invention is particularly applicable to an electromagnetic clutch and brake unit of the type described and claimed in my joint Patent No. 2,267,114 issued December 23, 1941. As applied to the unit described in said patent, the braking surface against which the clutch driven disk is normally spring biased is made selectively rotatable. Adjustably resilient means are provided for assuring a predetermined frictional engagement between the driven disk and the braking surface. The resilient means, which normally bias the driven disk of the clutch into engagement with the braking surface in the referred to patented device, is effective in the present construction to bias a rotatable member, upon which the braking surface is mounted, into interlocking rotation preventing engagement with a stationary element of the clutch housing. When the clutch disks are engaged, such braking surface support member is disengaged from such interlocking engagement, and is free to rotate.

It is among the objects of this invention to provide a clutch including a novel preloaded brake for a rotatable shaft; to provide a clutch construction including a preloaded brake effective to substantially instantly arrest motion of the clutch driven disk upon disengagement of the clutch; to provide an electromagnetic clutch and brake unit including a pair of magnetically engaged clutch disks, a preloaded brake associated with the driven disk, and means for restraining rotation of the brake when the clutch energizing winding is deenergized; to provide such an electromagnetic clutch including adjustable means for presetting the frictional engagement between the driven disk and a brake surface associated therewith; and to provide a simple, reliable and effective electromagnetic clutch and brake unit including a preloaded brake normally interlocked against rotation, but which is free to rotate when the clutch disks are engaged.

These and other objects, advantages and novel features of the invention will be apparent from the following description and the accompanying drawings. In the drawings:

Fig. 3 is a transverse view, partly in section, on the line 3—3 of Fig. 1.

Fig. 4 is a transverse sectional view on the line 4—4 of Fig. 1.

Fig. 5 is a schematic wiring diagram illustrating the operation of the invention.

Figure 1:
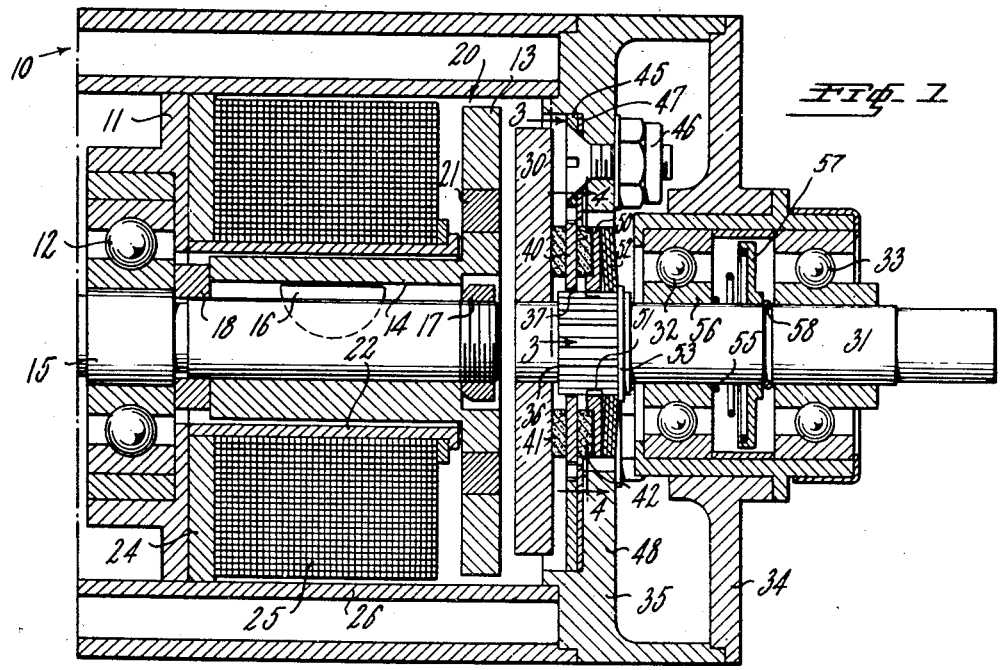
Fig. 1 is a longitudinal sectional view through an electromagnetic clutch incorporating the preloaded brake of the invention, showing the clutch in the disengaged position.

Referring to the drawings, the clutch and brake unit of the invention is illustrated as incorporated with an electric motor 10. Armature or drive shaft 15 of the electric motor is illustrated as supported in the end bell 11 thereof in a bearing 12. A clutch driving member 20 of magnetic material is illustrated as comprising a disk portion 13 and a hub portion 14 secured for rotation with drive shaft 15 by a key 16. Nut 17 threaded on the end of shaft 15 maintains driving disk 20 in engagement with a spacer ring 18 engaging bearing 12. Clutching surface 13 may be provided with one or more inserts 21 of non-magnetic material in the manner described in my aforementioned patent.

A magnetic flux creating winding for the flux is illustrated at 25 as mounted on a cylindrical winding support 22 of magnetic material closely surrounding hub 14. The magnetic circuit is completed by a plate 24, of a magnetic material, extending between winding support 22 and an inner housing member 26, likewise of magnetic material. Housing member 26 extends relatively close to the periphery of clutching surface 13 to establish a low reluctance magnetic air gap therewith.

Figure 2:
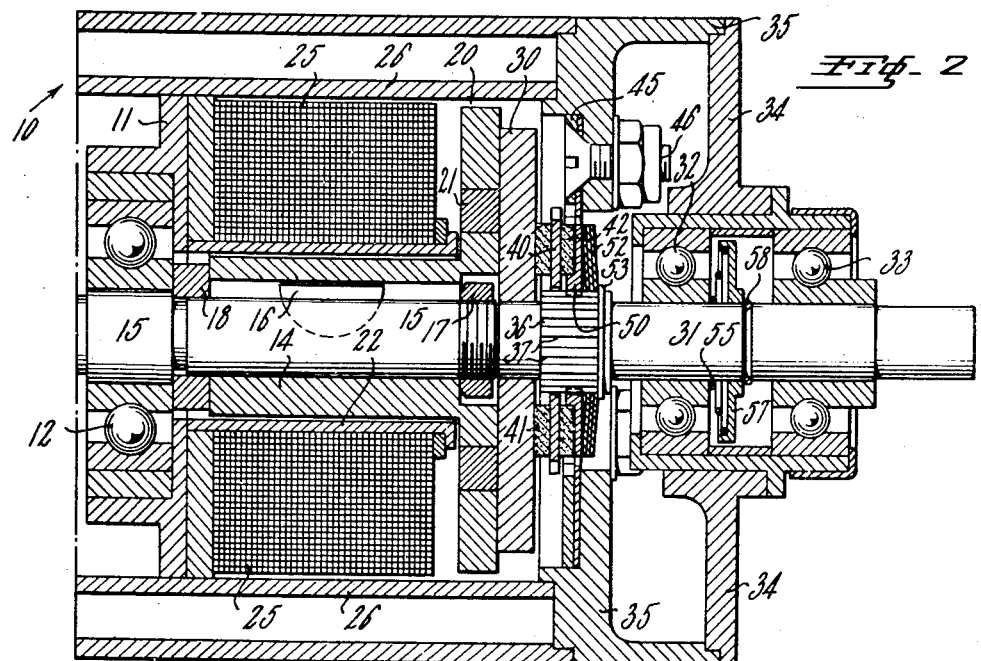
Fig. 2 is a view similar to Fig. 1 showing the clutch in the engaged or driving position.

Driven disk 30 of the clutch is secured in any suitable manner such as by brazing or welding, to the inner end of a driven shaft 31 mounted in bearings 32, 33 in an end plate 34 secured to an intermediate housing member 35. Outwardly from clutch-disk 30, shaft 31 is provided with an enlarged portion 36 formed with splines 37, as shown in Figs. 1, 2 and 3. A brake surface supporting ring 40 is mounted on enlarged portion 36 and is free to rotate thereon. Braking surfaces 41 and 42, of suitable friction material such as cork, are secured to either side of ring 40. Ring 40 is provided with a plurality of ears or lugs 43 (Fig. 3) on its periphery which are adapted to engage in notches 44 on the inner periphery of a locking ring 45 secured by bolt and nut arrangements 46 against a locking ring 47 juxtaposed on an annular flange 48 forming an inwardly extending part of housing member 35.

A pressure ring 50 is formed with splines 51 engaging splines 37 of shaft portion 36, as shown in Figs. 1, 2 and 4, and is therefore rotatable with shaft 31. Pressure ring 50 is maintained in frictional engagement with brake surface 42, and brake surface 41 is maintained in frictional engagement with driven disk 30, through the medium of a plurality of spring washers, or "Belleville" springs, 52 having their outer peripheries engaging ring 50 and their inner peripheries engaged by a snap ring 53 secured in a suitable notch in shaft portion 36. By suitable selection of the number of spring washers 52, the pressure with which the braking surfaces on brake ring 40 engage driven disk 30 and pressure ring 50 may be preset to any desired value.

The operation of the arrangement described thus far is as follows. Upon energization of winding 25, a magnetic flux path is created including winding support 22, ring 24, housing member 26, clutching surface 13 and driven disk 30. The magnetic flux interlinkage between the driving and driven disks is increased by the provision of non-magnetic inserts 21. When winding 25 is energized, the parts of the clutch are in the engaged position shown in Fig. 2, braking ring 40 is disengaged from locking ring 45, freeing driven shaft 31 and its associated elements for driving engagement with drive shaft 15 across the clutch.

When clutch winding 25 is deenergized, driven shaft 31 is moved axially to the right and the lugs 43 on braking ring 40 engage in the notches 44 on locking ring 45. This is accomplished by a coil spring 55 engaging the inner race 56 of bearing 32 and annular abutment 57 secured by a snap ring 58 to shaft 31. The parts then occupy the position shown in Fig. 1, in which the brake surfaces 41 and 42 exert a predetermined frictional drag on driven disk 30 and pressure ring 50, respectively, thus exerting a predetermined braking effect on shaft 31 and the driven mechanism connected thereto.

Fig. 5 schematically illustrates the invention as incorporated in an electric motor drive unit, in which motor 10 is illustrated as comprising an armature 60 and a pair of reversely wound field windings 61 and 62. Armature 60 is connected in series with a schematically illustrated clutch unit 65 which corresponds to the clutch unit shown in Figs. 1, 2 and 3. One terminal of armature 60 is connected to a terminal of power source, battery 63. The other terminal of battery 63 is connected to a contact arm 64 adapted to engage either one of a pair of contacts 66 or 67 respectively connected to field windings 61 and 62. When switch 64 is closed on either contact 66 or 67, motor 10 will be energized for rotation in a selective direction, and clutch 65 will be simultaneously energized for rotation in a selective direction to engage clutch disks 20 and 30 (Fig. 2) and thus disengage braking ring 40 from locking ring 45. Upon deenergization of motor 60, spring 55 snaps the driven elements of the clutch to the right, as shown in Fig. 1, so that lugs 40 engage notches 44 of locking ring 45 and a predetermined braking force is exerted upon driven shaft 31 substantially instantaneously arresting motion of the driven shaft while permitting armature 60 of motor 10 to coast to a stop.

The described invention provides an effective and accurately presettable brake for a rotatable shaft, and is of great utility in the magnetic clutch and brake construction shown in the drawings. By a suitable design of springs 52, the brake can be easily adjusted to take care of wear, variations in load, and other variable factors.

While a specific embodiment of the invention has been shown and described in detail to illustrate the application of the principles thereof, it will be understood that the invention may be otherwise embodied without departing from such principles.

What is claimed is:

1. A clutch and brake unit comprising, in combination, a driving member; a driven member; power drive means coupled to said driving member; a shaft rotatable with said driven member; a braking member rotatable on said shaft; means biasing said driven and braking members into frictional engagement; a device engageable with said braking member to lock the same against rotation; means normally biasing said braking member and said device into engagement to exert a frictional braking drag on the shaft through said driven member; and means operable, when activated, to engage said driving and driven members and to disengage said braking member from said device to provide for rotation of said shaft by said power drive means.

2. A magnetic clutch and brake unit comprising, in combination, a driving member of magnetic material; a driven member of magnetic material; power drive means coupled to said driving member; a shaft rotatable with said driven member; a braking member rotatable on said shaft; resilient means biasing said driven and braking members into frictional engagement; a device engageable with said braking member to lock the same against rotation; means normally biasing said braking member and said device into engagement to exert a frictional braking drag on the shaft through said driven member; and magnetic flux generating means operable, when activated, to engage said driving and driven members and to disengage said braking member from said device to provide for rotation of said shaft by said power drive means.

3. A clutch and brake unit comprising, in combination, a driving disk; an electric motor having an armature shaft coupled to said driving disk; a driven disk; a driven shaft rotatable with said driven disk; a braking member rotatable on said driven shaft; resilient means biasing said member and said driven disk into frictional engagement; a device engageable with said member to lock the same against rotation; means normally biasing said braking disk and said device into engagement to exert a frictional braking drag on said driven shaft through said driven disk; and means operable, when activated, to engage said driving and driven disks and to disengage said braking member from said device to provide for rotation of said driven shaft by said electric motor.

4. A clutch and brake unit comprising, in combination, a driving disk of magnetic material; an electric motor having an armature shaft coupled to said driving disk; a driven disk of magnetic material; a driven shaft rotatable with said driven disk; a braking member rotatable on said driven shaft; resilient means biasing said member and said driven disk into frictional engagement; a device engageable with said member to lock the same against rotation; means normally biasing said braking member and said device into engagement to exert a frictional braking drag on said driven shaft through said driven disk; and magnetic flux generating means operable, when activated, to engage said driving and driven disks and to disengage said braking member from said device to provide for rotation of said driven shaft by said electric motor.

5. A magnetic clutch and brake unit comprising, in combination, a driving disk of magnetic material; a driven disk of magnetic material; a driven shaft rotatable with said driven disk; a housing rotatably mounting said driven shaft for axial movement; a braking ring rotatably mounted on said driven shaft; resilient means biasing said braking ring and said driven disk into frictional engagement; a locking ring secured to said housing; disengageable interlocking means on said rings whereby said locking ring is effective to restrain rotation of said braking ring; magnetic flux generating means, including a magnetizing winding, operable upon energization to engage said disks to drivingly couple the driving disk to said driven shaft; and means operable, upon deenergization of said magnetic flux generating means, to disengage said disks and interlockingly engage said rings to substantially instantaneously arrest motion of said driven shaft.

6. A magnetic clutch and brake unit comprising, in combination, a driving disk of magnetic material; a driven disk of magnetic material; a driven shaft rotatable with said driven disk; a housing rotatably mounting said driven shaft for axial movement; a braking ring rotatably mounted on said driven shaft; adjustable resilient means biasing said braking ring and said driven disk into predetermined frictional engagement; a locking ring secured to said housing; disengageable interlocking means on said rings whereby said locking ring is effective to restrain rotation of said braking ring; magnetic flux generating means including a magnetizing winding operable upon energization to engage said disks to drivingly couple the driving disk to said driven shaft; and resilient means operable, upon deenergization of said magnetic flux generating means to disengage said disks and interlockingly engage said rings to substantially instantaneously arrest motion of said driven shaft.

7. A magnetic clutch and brake unit comprising, in combination, a driving disk of magnetic material; a driven disk of magnetic material; a driven shaft rotatable with said driven disk; a housing rotatably mounting said driven shaft for axial movement; a pressure plate rotatable with said driven shaft and axially movable therealong; a braking ring rotatably mounted on said driven shaft and axially movable therealong between said driven disk and said plate, and having lugs on its external periphery; braking surfaces on either side of said braking ring; resilient means engaging said plate to effect frictional engagement between said braking surfaces, said driven disk and said plate; a locking ring secured in said housing and having notches engageable with said lugs to restrain rotation of said ring; magnetic flux generating means, including a magnetizing winding, operable upon energization to move said driven shaft axially to engage said disks to drivingly couple the driving disk to said driven shaft; and means operable, upon deenergization of said magnetic flux generating means, to move said driven shaft axially to disengage said disks and interlockingly engage said rings to substantially instantaneously arrest motion of said driven shaft.

8. A magnetic clutch and brake unit comprising, in combination, a driving disk of magnetic material; a driven disk of magnetic material; a driven shaft rotatable with said driven disk; a housing rotatably mounting said driven shaft for axial movement; a pressure plate rotatable with said driven shaft and axially movable therealong; a braking ring rotatably mounted on said driven shaft and axially movable therealong between said driven disk and said plate, and having lugs on its external periphery; braking surfaces on either side of said braking ring; adjustable resilient means engaging said plate to effect frictional engagement between said braking surfaces, said disk and said plate; a locking ring secured in said housing and having notches engageable with said lugs to restrain rotation of said ring; magnetic flux generating means, including a magnetizing winding, operable upon energization to move said driven shaft axially to engage said disks to drivingly couple the driving disk to said driven shaft; resilient means operable, upon deenergization of said magnetic flux generating means to move said driven shaft axially to disengage said disks and interlockingly engage said rings to substantially instantaneously arrest motion of said driven shaft through said driven disk and said pressure plate.

9. A braking device for a rotatable shaft comprising, in combination, a housing rotatably mounting said shaft for axial movement; a braking disk fixed to said shaft; a braking ring rotatably mounted on said shaft and having lugs on its external periphery; means biasing said ring and disk into frictional engagement; a locking ring secured in said housing and having notches engageable with said lugs to restrain rotation of said ring; resilient means normally biasing said braking ring axially into interlocking engagement with said locking ring to exert a frictional braking drag on said shaft through said braking disk; and mechanism selectively operable to disengage said rings to provide for unrestricted rotation of said shaft.

10. A braking device for a rotatable shaft comprising, in combination, a housing rotatably mounting said shaft for axial movement; a braking disk fixed to said shaft; a pressure plate rotatable with said shaft and axially movable therealong; a braking ring rotatably mounted on said shaft and axially movable therealong between said disk and said plate, and having lugs on its external periphery; braking surfaces on either side of said braking ring; resilient means engaging said plate to effect frictional engagement between said braking surfaces, said disk and said plate; a locking ring secured in said housing and having notches engageable with said lugs to restrain rotation of said ring; resilient means normally biasing said braking ring axially into interlocking engagement with said locking ring to exert a frictional braking drag on said shaft through said braking disk; and mechanism selectively operable to disengage said rings to provide for unrestricted rotation of said shaft.

11. A braking device for a rotatable shaft comprising, in combination, a housing rotatably mounting said shaft for axial movement; a braking disk fixed to said shaft; a pressure plate rotatable with said shaft and axially movable therealong; a braking ring rotatably mounted on said shaft and axially movable therealong between said disk and said plate, and having lugs on its external periphery; braking surfaces on either side of said braking ring; adjustable resilient means engaging said plate to effect a predetermined frictional engagement between said braking surfaces, said disk and said plate; a locking ring secured in said housing and having notches engageable with said lugs to restrain rotation of said ring; resilient means normally biasing said shaft in an axial direction to move said braking ring into interlocking engagement with said braking ring to exert a frictional braking drag on said shaft through said braking disk and said pressure plate; and mechanism selectively operable to disengage said rings to provide for unrestricted rotation of said shaft.

WILLIAM P. LEAR.

REFERENCES CITED

The following references are of record in the file of this patent:

UNITED STATES PATENTS

| Number | Name | Date |
| --- | --- | --- |
| 971,937 | Taylor | Oct. 4, 1910 |
| 1,555,724 | Tuppen | Sept. 29, 1925 |
| 2,315,298 | Thompson | Mar. 30, 1943 |
| 2,385,479 | Underhill | Sept. 25, 1945 |